3,245,816
COATING COMPOSITIONS AND METHODS OF PRODUCING SAME

Hellmuth C. Schwalbe, Chillicothe, Ohio, assignor to The Mead Corporation, Dayton, Ohio, a corporation of Ohio
No Drawing. Filed June 8, 1962, Ser. No. 200,961
24 Claims. (Cl. 106—213)

This invention relates to a method for producing free-flowing, stable dispersions of satin white and, more particularly, to satin white dispersions which do not gel or increase significantly in viscosity on standing.

Satin white, generally given the chemical name of calcium sulfoaluminate, is a well-known pigment which has been extensively used in the manufacture of coated printing papers. It is a reaction product of alum ($Al_2(SO_4)_3$) and slaked lime ($Ca(OH)_2$) and is usually produced as a paste containing about 30% solids. Various formulae have been proposed for satin white, but the most generally accepted formula is:

$$3CaO \cdot Al_2O_3 \cdot 3CaSO_4 \cdot 31H_2O$$

The pigment shows a strong alkaline reaction, and may contain free lime, and/or other extraneous ions, depending on the purity of the starting materials used in its production.

In coating paper, satin white is often mixed with other pigments, such as, clay, calcium carbonate and/or titanium dioxide. Its use has been beset with many difficulties which have limited its application to the higher priced grades of coated paper, although its ease of finishing to a high gloss and its superior ink acceptance have been long recognized. One particularly vexsome problem is that of preparing fluid dispersions utilizing the satin white pigment which yield coating compositions with stable viscosity characteristics. While many dispersing agents for satin white are known, most yield initially fluid dispersions which tend to gel over a relatively short period of time, or else show such an increase in viscosity as to seriously upset coating operations. The prior art is replete with attempts to produce stable, free flowing dispersions of satin white, but the more successful efforts utilize protein or other similar colloids for stabilization, which result in relatively high cost paper coating compositions. One early method employs gum arabic for this purpose, while others use casein as a protective and/or stabilizing colloid in combination with other dispersing agents such as polyphosphates, sodium salts of long chain alkyl sulfonic acids, etc. While starch has been proposed as an agent for dispersing satin white, such dispersions almost invariably show progressive increases in viscosity and, in fact, frequently result in gel formation. Since present day paper coating methods and equipment are predicated on coating colors of constant viscosity, unstable colors exhibiting increasing viscosity present particularly objectionable operating problems.

It is therefore a principal object of the invention to provide free-flowing, viscosity stable, starch-based dispersions of satin white.

It is another object to provide paper coating colors wherein the pigment comprises satin white, said colors having stable viscosity characteristics.

Other objects will become apparent from the description of the invention which follows.

The present invention resides in the discovery that satin white dispersions of stable viscosity characteristics may be prepared by dispersion with starch products which have been treated to achieve a suitable viscosity, as set forth later herein, with the added conjoint use of a material capable of forming coordination compounds, under alkaline conditions, with metal ions, such as calcium and aluminum ions. Suitable materials for this latter purpose are certain hydroxy carboxylic acids, di-carboxylic acids and other alkali-stable sequestering agents for calcium and aluminum such as tetra-sodium ethylene diamine tetra-acetate.

Starches of various types have long been used as pigment binders for paper coatings. In practically all cases, these starches have been subjected to various treatments to reduce their molecular weight, and hence permit higher concentrations at reasonable viscosity. These treatments involve reaction with acids, hypochlorites, oxidizing agents, hydrolytic enzymes and the like. For example, corn, tapioca or potato starches treated with ethylene oxide to produce hydroxyethyl starch ethers of a low degree of substitution are particularly suitable for carrying out this invention. Likewise, starches treated to reduce intrinsic viscosity with acids, oxidizing agents or enzymes, result in products which are also well suited for the practice of this invention.

The use of such starch products alone for dispersing satin white will not yield the viscosity stable dispersions of this invention. The fine particles of satin white apparently occlude calcium and aluminum ions, and these are slowly released over a period of time. Such metal ions have a coagulating or gelling effect on pigment dispersions and starch sols, with the result that viscosity increases markedly on standing, and may even result in gelation of the entire mass. By adding the sequestering agents of this invention to satin white dispersed with the starch products described above, the calcium and aluminum ions are effectively tied up in coordination compounds, and their gelling action is prevented.

While there are many known sequestering agents for calcium and aluminum, the alkaline nature of satin white, and of coating colors containing satin white, limits the useful sequestering agents to those which form stable coordination compounds with calcium and aluminum ions under alkaline conditions, such as a pH range from 8 to 10, or even higher. While not necessarily a complete listing of all suitable sequestering agents, the following have been found to be useful for the purposes of this invention: sodium salts of alpha-hydroxy-carboxylic acids such as citric, tartaric, gluconic, saccharic, glycollic, salicyclic and lactic acids, sodium salts of polybasic acids such as succinic acid; sodium salts of certain aminopolycarboxylic acids such as ethylenediamine tetra-acetic acid, N-hydroxyethyl ethylenediamine triacetic acid, nitrilotriacetic acid, diethylenetriamine penta-acetic acid; and the sodium salts of certain phospho-lipids such as phytic acid (which is a hexa-phosphate ester of meso-inositol). All of the foregoing produce metal chelates which are stable under the alkaline conditions prevailing in satin white dispersions and coating compositions prepared therefrom. While the sodium salts of the aforesaid chelating agents are preferred because of economy, other soluble salts are equally effective, and can be used for practicing the invention.

The following examples will serve to illustrate the invention, but are not intended to limit the scope thereof.

EXAMPLE 1

To 100 parts of satin white paste, were added 7.5 parts of Essex Gum 1390 (a hydroxyethyl starch ether derived from potato starch, marketed by Pennick & Ford) and the mass milled in a ball mill until fluid. The resultant slurry had a solids content of 27% on an air-dry basis. Portions of this slurry were then treated with varying amounts of sodium citrate, added in solution at a concentration of 25%. The viscosities of these dispersions were measured with a Brookfield viscosimeter in comparison to slurries of equal solids content but without added sodium citrate. The data obtained are given in Table I, infra.

EXAMPLE 2

The procedure of Example 1 was followed, except that sodium lactate was used in place of sodium citrate. The data are also shown in Table 1, infra.

EXAMPLE 3

The procedure of Example 1 was followed, except that tetra-sodium ethylene diamine tetra-acetate was used in place of sodium citrate. Data are given in Table I.

EXAMPLE 4

The procedure of Example 1 was followed, except that sodium succinate was used in place of sodium citrate. Data are given in Table I.

EXAMPLE 5

The procedure of Example 1 was followed, except that sodium phytate was used in place of sodium citrate. The data are also given in Table I.

EXAMPLE 6

The same procedure as Example 1 was followed, except that sodium glycollate was used in place of sodium citrate. The data are given in Table I.

Table I.—Viscosity of satin white dispersions

| Example No. | Sequestering Agent | Brookfield Viscosity, cp. (60 r.p.m.)—Amount of Sequestering Agent added, percent on Satin White | | | | |
|---|---|---|---|---|---|---|
| | | 0.082 | 0.164 | 0.246 | 0.328 | 0.410 |
| | None [1] | 21.8 | 21.0 | 20.3 | 19.7 | 19.1 |
| 1 | Na Citrate | 22.3 | 21.0 | 18.3 | 17.0 | 16.4 |
| 2 | Na Lactate | 22.5 | 19.9 | 19.0 | 18.3 | 18.7 |
| 3 | Na EDTA [2] | 18.0 | 17.2 | 16.8 | 16.6 | 16.7 |
| 4 | Na Succinate | 21.7 | 19.0 | 17.5 | 17.0 | 16.7 |
| 5 | Na Phytate | 20.0 | 18.7 | 18.8 | 21.0 | 21.0 |
| 6 | Na Glycollate | 21.0 | 18.2 | 18.3 | 18.1 | 17.0 |

[1] The values given for the blank are those obtained on dispersions having the same solids content as Examples 1–6. There is a small, progressive dilution by the water present in the solutions of the sequestering agents, and this dilution has been matched by dispersions containing no sequestering agent, to provide comparable data.
[2] Ethylene diamine tetra-acetate.

A comparison of the data in Table I shows that all of the sequestering agents were effective in providing starch dispersed satin white slurries of lower viscosity than can be obtained without their use. The agents vary in the amount required to produce minimum viscosity, and also in the minimum viscosity attainable, sodium citrate, sodium succinate and tetra-sodium ethylene diamine tetra-acetate giving somewhat lower viscosity slurries than the others, although all of them, as previously mentioned, are usefully effective in producing free-flowing starch-dispersed satin-white slurries.

EXAMPLE 7

To a portion of the ball-milled satin white dispersion of Example 1 was added 0.41% (based on dry weight of satin white) of sodium citrate. The initial viscosity was determined and the slurry was then allowed to stand without agitation for 17.5 hours, with viscosity measurements made at the end of 1.75 hours and 17.5 hours. The data obtained are shown in Table II, infra.

EXAMPLE 8

The procedure of Example 7 was followed, except that the 0.41% sodium citrate was replaced with 0.29% of sodium lactate. Viscosity measurements were made after various periods of standing as in Example 7. Data are included in Table II.

EXAMPLE 9

The procedure of Example 7 was repeated, except that the 0.41% of sodium citrate was replaced with 0.21% of tetra-sodium ethylene diamine tetra-acetate. Viscosity measurements were made as in Example 7, and the data so obtained are included in Table II.

EXAMPLE 10

The procedure of Example 7 was repeated, except that the 0.41% of sodium citrate was replaced with 0.29% sodium succinate. Viscosity measurements were made after various periods of standing as in Example 7, and these data are set forth in Table II.

EXAMPLE 11

The procedure of Example 7 was followed, except that the 0.41% of sodium citrate was replaced with 0.15% of sodium phytate. Viscosity measurements were made after various periods of standing as in Example 7, and the data are likewise presented in Table II.

EXAMPLE 12

The procedure of Example 7 was repeated, except that the 0.41% of sodium citrate was replaced with 0.40% of sodium glycollate. Viscosity measurements were made after various periods of standing as in Example 7, and the data are presented in Table II.

Table II

| Example No. | Sequestering Agent | Amount, percent | Brookfield Viscosity, 60 r.p.m., cps. | | |
|---|---|---|---|---|---|
| | | | Initial | After 1.75 hrs. | After 17.5 hrs. |
| | None | 0 | 22.3 | gelled | gelled |
| 7 | Na Citrate | 0.41 | 18.0 | 18.2 | 18.7 |
| 8 | Na Lactate | 0.29 | 18.8 | 20.8 | 20.7 |
| 9 | Na EDTA [1] | 0.21 | 19.4 | 21.5 | 21.0 |
| 10 | Na Succinate | 0.29 | 19.7 | 20.8 | 19.5 |
| 11 | Na Phytate | 0.15 | 19.5 | 24.2 | 19.6 |
| 12 | Na Glycollate | 0.40 | 19.0 | 20.0 | 20.8 |

[1] Tetra-sodium ethylene diamine tetra-acetate.

In Examples 7 through 12, the amount of the various sequestering agents used was selected as a practical minimum to achieve the desired effect of preventing gelation on standing. All of the agents of Examples 7 through 12 were highly effective in maintaining substantially constant viscosity over a practical mill operating time period. None of the satin white slurries treated according to the invention showed gelation on standing, whereas a starch-ether dispersed slurry, without sequestering agent, gelled after less than 2 hours' standing.

It will be apparent to those skilled in the art that the amount of sequestering agent needed to insure freedom from gelation and stable viscosity characteristics in coating colors used for paper coating, where the satin white slurry is admixed with other pigment dispersions, adhesives, and coating adjuncts will vary from that shown in Examples 1 to 12, depending on a number of factors which relate to the potential ion metal content (particularly $Ca^{++}$ and $Al^{+++}$) of the coating color. Calcium and aluminum ions, as well as other metal ions, can arise from poorly washed satin white, from ions adsorbed on clay, from reactive pigments such as calcium carbonate, from mill water supplies, and perhaps from ions leached out of the paper base stock. Consequently, it is within the scope and intent of this invention to adjust the amount of sequestering agent to that quantity required to sequester or chelate the stray metal ions present in the coating composition, from whatever source. While the foregoing examples show amounts ranging from less than 0.1% up to 0.41%, the examples were limited to satin white pigment dispersions, free of the other ingredients used to formulate paper coating colors. Somewhat larger amounts are desirable when dealing with coating colors, as shown in the following examples of commerically useful coating compositions:

EXAMPLE 13

| | | |
|---|---|---|
| Coating clay (dry basis) | parts | 59 |
| Satin white (dispersed with 6.5% Essex Gum and 0.77% sodium citrate in a ball mill) | parts | 25 |
| Starch (enzyme treated) | do | 12.5 |
| Acrylic polymer latex (Rhoplex B-15) | do | 3.0 |
| Total solids (oven-dry) | percent | 46 |
| Viscosity | poises | 37.7 |

To this basic formula are added various other materials, as desired, such as dispersing agents for clay and/or other pigment, defoamers, preservatives, dye or pigment colors and the like.

This composition was applied as a top-coat to both sides of a base coated magazine cover paper stock on a modern high-speed paper machine having two coating stations. The resultant paper was of excellent quality, having good gloss, good printing characteristics and was free of the objectionable yellowing frequently encountered when casein was used as a dispersant for the satin white. During a 22-hour trial operation with this coating color, there was no observable build-up of viscosity.

EXAMPLE 14

| | | |
|---|---|---|
| Coating clay (dry basis) | parts | 63.5 |
| Calcium carbonate (dry basis) | do | 11.5 |
| Satin white (dispersed with 6.5% Essex gum and 0.77% sodium citrate in a ball mix) (dry basis) | parts | 25.0 |
| Starch (enzyme treated) (dry basis) | do | 13.0 |
| Solids (oven dry basis) | percent | 47.6 |
| Viscosity | poises | 43 |

To this basic formula are added various other materials, as desired, such as dispersing agents for clay and/or other pigment, defoamers, preservatives, dye or pigment colors and the like.

This coating color was applied to both sides of base-coated book paper stock on a modern high speed paper machine equipped with two coating stations. There was no observable build-up of viscosity over a trial period extending for seven hours. The paper produced was of good quality, and substantially free of the yellowing frequently encountered when casein is used to disperse satin white. Printing quality was excellent, and the paper had a pleasing gloss or finish.

The coating colors of Examples 13 and 14 are intended to be suggestive, rather than limitative, and many variations will be evident to those skilled in the art. For example, certain types of coating apparatus require rather specific viscosity ranges for acceptable operation, and adjustment of total solids content to achieve a desired viscosity for specific apparatus is a relatively minor change which would be evident to those skilled in paper coating.

Likewise, the inclusion of satin white in relatively larger proportions, even up to the whole of the pigment content, may be desirable for certain coated paper products. Often coated printing papers of very low basis weight are desirable, as in the case of illustrated magazines distributed through the mails. Increasing postal rates represent a huge burden to the publishers, and can only be offset by reducing the total weight of the magazine. Since publishers are reluctant to decrease the number of pages, the remaining alternative is to decrease the basis weight of the paper. The high standards of printing quality required by such magazines make the use of coated paper almost mandatory. There is a lower limit to the basis weight of the paper base stock, imposed by strength requirements to meet the demands of high speed printing operations, so that reductions in coating weight become highly significant. One approach to reduce coating weights while maintaining acceptable coverage of the base stock for good printing quality is to reduce the specific gravity of the coating pigments used. And satin white has a specific gravity of 1.81 as compared to clay at 2.58 and calcium carbonate at 2.7. Thus, coatings comprising a major amount of satin white permit significant reductions in coating weight per ream while maintaining coating film thickness at levels necessary to insure good printability.

While certain preferred embodiments of the invention have been set forth in the foregoing description and examples, it is to be understood that the present invention includes all modifications and equivalents which fall within the scope of the invention, which is defined by the appended claims.

What is claimed is:

1. A method for preparinng viscosity stable dispersons of satin white comprising mixing therewith a paper coating starch product in an amount from about 3% to about 10% by weight of the dry satin white, followed by adding thereto and mixing therewith an alkali-stable chelating agent in an amount ranging from 0.05% to 2% by weight of the dry satin white.

2. The method of claim 1 wherein the chelating agent is a water-soluble salt of an alpha-hydroxy carboxylic acid.

3. The method of claim 2 wherein the water-soluble salt of an alpha-hydroxycarboxylic acid is sodium citrate.

4. The method of claim 2 wherein the water-soluble salt of an alpha-hydroxycarboxylic acid is sodium lactate.

5. The method of claim 2 wherein the water-soluble salt of an alpha-hydroxycarboxylic acid is sodium glycollate.

6. The method of claim 1 wherein the chelating agent is a water-soluble salt of a dicarboxylic acid.

7. The method of claim 6 wherein the water-soluble salt of a dicarboxylic acid is sodium succinate.

8. The method of claim 1 wherein the chelating agent is a water-soluble salt of an aminopolycarboxylic acid.

9. The method of claim 8 wherein the water-soluble salt of an aminopolycarboxylic acid is tetrasodium ethylene-diamine tetra-acetate.

10. The method of claim 1 wherein the chelating agent is the water-soluble salt of a phospho-lipid.

11. The method of claim 10 wherein the water-soluble salt of a phospho-lipid is sodium phytate.

12. A method for preparing viscosity stable coating compositions for paper and the like comprising adding a satin white slurry to a mixture of pigment and adhesive, said satin white slurry comprising satin white, a paper coating starch product in an amount from about 3% to about 10% by weight of the dry satin white and an alkali-stable chelating agent in an amount from 0.05% to 2% by weight of the dry satin white.

13. The method of claim 12 wherein the chelating agent is a water-soluble salt of an alpha-hydroxycarboxylic acid.

14. The method of claim 13 wherein the water-soluble salt of an alpha-hydroxycarboxylic acid is sodium citrate.

15. The method of claim 13 wherein the water-soluble salt of an alpha-hydroxycarboxylic acid is sodium lactate.

16. The method of claim 13 wherein the water-soluble salt of an alpha-hydroxycarboxylic acid is sodium glycollate.

17. The method of claim 12 wherein the chelating agent is a water-soluble salt of a dicarboxylic acid.

18. The method of claim 17 wherein the chelating agent is sodium succinate.

19. The method of claim 12 wherein the chelating agent is a water-soluble salt of an aminopolycarboxylic acid.

20. The method of claim 19 wherein the water-soluble salt of an aminopolycarboxylic acid is tetrasodium ethylene-diamine tetra-acetate.

21. The method of claim 12 wherein the chelating agent is a water-soluble salt of a phospho-lipid.

22. The method of claim 21 wherein the water-soluble salt of a phospho-lipid is sodium phytate.

23. A viscosity stable dispersion of satin white comprising from about 88 to about 97%, dry basis of satin white, a paper coating starch product in an amount from about 3% to 10%, dry basis and an alkali-stable chelating agent selected from the group of water-soluble salts of alpha-hydroxycarboxylic acids, dicarboxylic acids, aminopolycarboxylic acids and phospho-lipids in an amount from about 0.05% to 2%, dry basis.

24. A viscosity stable coating composition for paper and the like comprising coating clay pigment, adhesive and a significant proportion of satin white dispersion, said satin white dispersion comprising from about 88 to 97%, dry basis, satin white, a paper coating starch product in an amount from about 3% to about 10%, dry basis, and an alkali-stable chelating agent in an amount from about 0.05% to about 3%, dry basis, said chelating agent being selected from water-soluble salts of alpha-hydroxycarboxylic acids, dicarboxylic acids, aminopolycarboxylic acids and phospho-lipids.

References Cited by the Examiner

UNITED STATES PATENTS

| | | | |
|---|---|---|---|
| 1,147,996 | 7/1915 | Wrede | 117—156 |
| 1,913,329 | 6/1933 | Bradner | 117—156 |
| 2,024,123 | 12/1935 | Baker | 117—156 |
| 2,059,343 | 11/1936 | Hadfield | 117—156 |
| 2,849,334 | 8/1958 | Hart | 117—156 |

OTHER REFERENCES

Casey: "Pulp and Paper," vol. 2, 1952, pp. 1057, 1069, 1071, Interscience Publishers Inc., New York.

ALEXANDER H. BRODMERKEL, *Primary Examiner.*

JOSEPH REBOLD, *Examiner.*

J. CARSON, L. HAYES, *Assistant Examiners.*